United States Patent [19]

Zengel et al.

[11] 3,927,085

[45] Dec. 16, 1975

[54] PROCESS FOR THE PRODUCTION OF A MERCAPTOCARBOXYLIC ACID

[75] Inventors: Hans-Georg Zengel, Kleinwallstadt; Anton Toth, Obernburg; Helmut Magerlein, Obernburg; Gerhard Meyer, Obernburg, all of Germany

[73] Assignee: Akzo N. V., Arnhem, Netherlands

[22] Filed: Oct. 15, 1974

[21] Appl. No.: 514,463

[30] Foreign Application Priority Data

Oct. 29, 1973 Germany............................ 2354098

[52] U.S. Cl......... 260/526 S; 260/535 R; 260/537 P
[51] Int. Cl.²......................................... C07C 148/00
[58] Field of Search................................. 260/526 S

[56] References Cited
UNITED STATES PATENTS

| | | | |
|---|---|---|---|
| 2,449,989 | 9/1948 | Gresham........................ | 260/526 S |
| 2,594,030 | 4/1952 | Coons et al.................... | 260/526 S |
| 2,945,880 | 7/1960 | DePree et al.................. | 260/526 S |
| 3,029,279 | 4/1962 | Kondo............................ | 260/526 S |
| 3,502,708 | 3/1970 | Thoma et al. .................. | 260/526 S |
| 3,517,058 | 6/1970 | Thoma et al. .................. | 260/526 S |
| 3,551,499 | 12/1970 | Krockow ........................ | 260/526 S |

*Primary Examiner*—Vivian Garner
*Attorney, Agent, or Firm*—Johnston, Keil, Thompson & Shurtleff

[57] ABSTRACT

A process for the production of mercaptoacetic acid and β-mercaptopropionic acid by reacting hydrogen sulfide at a partial pressure above 2 atm., preferably 8 to 22 atm. and at a temperature of about 60°C. to 140°C., preferably 80°C. to 105°C., in admixture with a chlorocarboxylic acid compound of the formula $Cl-(CH_2)_n-COOM$, wherein $n$ is the integer 1 or 2 and M is hydrogen, ammonium or sodium or mixtures thereof in the presence of aqueous sodium or ammonium hydroxide and the initial reaction mixture has a concentration of the chlorocarboxylic acid compound in water of about 4.0 to 12 mol percent, preferably 6.0 to 9.3 mol percent.

9 Claims, No Drawings

PROCESS FOR THE PRODUCTION OF A MERCAPTOCARBOXYLIC ACID

The present invention is concerned with a method for the preparation of thioglycolic acid (mercaptoacetic acid) and β-mercaptopropionic acid from monochloroacetic acid and β-chloropropionic acid, respectively.

Several thioglycolic acid syntheses have been published. Carius was the first one to obtain thioglycolic acid through reaction of monochloroacetic acid and potassium hydrogen sulfide [Ann. (1862), 124, 43]. Burgotti produced thioglycolic acid in a two-step synthesis by reaction of monochloroacetic acid with sodium thiosulfate followed by hydrolysis of the resulting Bunte salt [Gaz. Chim. Ital. (1892), 221, 422]. This latter synthesis can be used for the commercial production of thioglycolic acid; See U.S. Pat. No. 2,413,361, U.S. Pat. No. 2,594,030 and British Pat. No. 624,568.

According to a synthesis first described by Friedländer, chloroacetic acid or its salts are reacted with alkali polysulfides, the resulting dithioglycolic acid then being reduced to thioglycolic acid by means of zinc and a mineral acid (German Pat. No. 180,875). Thioglycolic acid also results from the hydrolysis of 2-imino-4-thiazolidone which is readily accessible from the reaction of monochloroacetic acid and thiourea (Japanese Pat. No. 3158/'52). Furthermore it is possible to synthesize thioglycolic acid from sodium monochloroacetate and sodium trithiocarbonate (Belgian Pat. No. 668,462), as well as from sodium acetate and sulfur (U.S. Pat. No. 2,945,880).

It is further known that thioglycolic acid can be produced according to a method of Biilman, Ann. 339 (1905), 351, and Ann. 348 (1906) 120, through cleavage of ethyl xanthogenic acetic acid by means of ammonia. Ethylxanthogenic acid amide (xanthogenamide) arises as a by-product in this process. Although this method shows good yields, it is somewhat disadvantageous because the two different reaction products have to be separated in a tedious and expensive extraction process. Furthermore, this method is uneconomical because the xanthogenamide by-product cannot be utilized and must be discarded. If the cleavage of ethyl xanthogenic acid is done with amines, the result is a byproduct on the form of a substituted thiourethane [E. Mameti, Ann. Chim, — (Rom) 45, 211–28 (1956); compare C. A. 51 (1957), 402g]. With the cleavage of ethyl xanthogenic acetic acid by means of alcoholic potash, one obtains a potassium ethylthiocarbonate (Bender's salt) in addition to the potassium salt of the thioglycolic acid. If the alkali salt of the thioglycolic acid is treated with boiling water or with an alkaline solution, there is obtained in addition to the alkali salt of the ethyl xanthogenic acid, as further split off products ethanol, carbon dioxide, and hydrogen sulfide. The ethyl xanthogenic propionic acid disintegrates in the same manner [B. Holmberg, J. practical Chemistry (2) 71 (1905), 264]. In a cleavage of xanthogenic acid esters by means of acids, the corresponding mercaptan and the corresponding compound as well as carbonyl sulfide are obtained (Houben-Weyl, Georg-Thieme-Verlag, Stuttgart, Volume IX, page 318). These cleavage reactions of the ethyl xanthogenic acids are not suitable for the technical synthesis, i.e. the industrial or commercial production of the mercaptocarboxylic acids because, even in the case of ammonia cleavage, the by-products obtained are of no value or only very slight value.

Of all the syntheses mentioned, that of Carius alone is suitable as a basis for the technical production of thioglycolic acid. The result in this case is always a mixture of thioglycolic acid and thiodiglycolic acid. According to Klason and Carlson, the yield of thioglycolic acid can be increased if one proceeds by using dilute monochloroacetic acid and potassium hydrosulfide solutions and with the KHS in a molar excess of 100% [Ber. 39 (1906), 732–738]. The authors claim to have obtained a 99.6% yield from the use of 15% by weight monochloracetic acid and potassium hydrosulfide solutions. In another publication on thioglycolic acid, it is maintained that these results can be reproduced only if the hydrosulfide is prepared directly before its use [Schütz, Applied Chemistry, 46 (1933), Page 780–1]. Later publications by Vögler and Mulvaney, however, have proven that the high yields claimed by Schütz cannot be reproduced [Vögler, Siefen-Öle-Fette-Wachse, No. 9-1951, pages 203–6; Mulvaney, Pro. Scientific Section Toil Goods Assoc., Inc., No. 5, dated May 17, 1946].

The thioglycolic acid synthesis, according to Klason and Carlson, can be best carried out on a technical basis if the process is started with the alkali salt of the monochloroacetic acid rather than the acid itself. According to this method, a maximum conversion of 95% and yields of 80% of a vacuum distilled thioglycolic acid resulted when using a NaHS liquor of not more than 15% by weight and a monochloroacetic acid solution of not more than 20% by weight, which corresponds to a monochloroacetic acid concentration in water of 4.5 mol percent. When the concentration was raised by 5% or 10%, corresponding to a monochloracetic acid concentration in water of about 6.0 and 7.5 mol percent, respectively, the yield decreased by 10% and 20%, respectively (Vögler, *supra*, page 204).

From the Japanese patent application No. 68/17,564 (compare Chemical Abstracts 70 (1969) 157163e) a method is known whereby an aqueous solution of potassium hydrosulfide, saturated with hydrogen sulfide, is reacted with an aqueous solution of potassium monochloroacetate at a temperature of 90°C. under a nitrogen pressure of 7 atm. It is stated that one obtains a quantitative yield. However, this method is unsuitable for the technical synthesis of thioglycolic acid because it proceeds from expensive potassium compounds. If the corresponding sodium compounds are used under the same conditions, crude product yields of only 65% of theory are obtained.

For economical reasons, only those methods can be considered for the industrial production of thioglycolic acid which are based on the use of sodium hydroxide, i.e. those processes using a caustic soda solution and hydrogen sulfide or sodium hydrogen sulfide and monochloracetic acid or its sodium salt. In these methods, the only available alternatives have been to either work with a low concentration solution to obtain high yields or else use high concentration solutions and accept the resulting poor yields.

It is known to produce β-mercaptopropionic acid by the reaction of β-propiolactone acid with potassium hydrosulfide. However, this method so far has not yielded a pure β-mercaptopropionic acid. For the production of pure β-mercaptopropionic acid, it is recommended that the crude product obtained in the reaction of β-iodopropionic acid be oxidized by means of iron chloride into β-dipropionic acid disulfide and subsequently reduce this to β-mercaptopropionic acid [J. M. Loven, Journ. prakt. Chem. (2) 29 (1884), 376]. This method is very cumbersome and therefore unsuitable for the technical production of β-mercaptopropionic acid.

It is also known to first convert β-iodopropionic acid by reaction with potassium xanthogenate into β-xanthogenpropionic acid [E. Biilman, Ann. 339 (1905) 363], and then subject this intermediate to treatment with an alcoholic ammonia solution. In this method, the yield of β-mercaptopropionic acid is only 57% of theory, in addition to xanthogenamide and β-dipropionic acid amide as by-products. This yield can be increased to 79% of theory if, after separation one of the xanthogenamide, one subjects the acid mixture to a reduction and in the same manner converts the β-dipropionic acid sulfide into β-mercaptopropionic acid [E. Biilman, Ann. 348 (1906) 120].

It is further known that β-mercaptopropionic acid can be produced from propiolactone. According to this process as described in U.S. Pat. No. 2,449,989, an aqueous or alcoholic solution of β-propiolactone is introduced into an aqueous or alcoholic solution of a hydrogen sulfide, e.g. sodium hydrosulfide. Using an excess of hydrogen sulfide and maintaining the reaction temperature within a range of −25 to −10°C., the yield of β-mercaptopropionic acid amounts to 87.4% of theory together with a yield of 7.3% of theory of dipropionic acid sulfide.

According to the method specified in U.S. Pat. No. 2,474,838, β-propionacton is first converted to S-β-carboxyethylisothiourea which is subsequently transformed into the sodium salt of β-mercaptopropionic acid by treatment with sodium hydroxide at an elevated temperature and then finally converted into the free acid by acidifying the reaction mixture. The formation of the S-β-carboxyethylisothiourea as well as its cleavage results in quantitative yields.

Acrylonitrile is also suitable as an initial material for the synthesis of β-mercaptopropionic acid. According to the method specified in U.S. Pat. No. 3,029,279, acrylonitrile in concentrated hydrochloric acid at temperatures of 70°–115°C. is converted quantitatively into S-β-carboxyethylisothiourea which is then converted to β-mercaptopropionic acid as described above [also compare Japanese Pat. No. 2913 ('60); C. A. Vol. 54 (1960), 2881c]. According to the method of U.S. Pat. No. 3,069,472, β-mercaptopropionic acid can be recovered in a 71.4% yield if tertiary dodecylmercaptan is reacted with acrylonitrile in portions at 35°C., in the presence of sodium ethylate. The resulting reaction mixture is subsequently treated with concentrated hydrochloric acid. It is known from U.S. 3,280,163, that acrylonitrile in the presence of small amounts of sulfur and an organic base, e.g. 2-methyl-5-ethylpyridine, can be converted into β-mercaptopropionitrile and this can be hydrolyzed into β-mercaptopropionic acid with concentrated hydrochloric acid. The maximum yield thus obtained is approximately 67%, the yield from the hydrolysis being about 65%. Furthermore, it is known from Japanese Pat. No. 7270 ('60) [compare C. A. Vol. 55 (1961) 6381] that one can convert acrylonitrile in an aqueous sodium bicarbonate solution with a solution of sodium sulfide and sulfur. The dithiopropionic acid nitrile thus produced can subsequently be hydrolyzed and reduced by treatment with zinc and hydrochloric acid in one stage into β-mercaptopropionic acid.

Instead of acrylonitrile, acrylic acid can also be employed in the production of β-mercaptopropionic acid. According to the method of R. Dahlbom, Acta Chemica Scand. 5 (1951), 690, hydrogen sulfide is fed into a solution of acrylic acid in diethylamine and methanol at a temperature of −20°C. The reaction mixture is then heated to 70°C. for several hours in a closed vessel. The yield of β-mercaptopropionic acid amounts to only about 50% of theory. According to an improved method specified in the British Pat. No. 1,150,720, one obtains yields of β-mercaptopropionic acid in excess of 90% of theory if the acrylic acid is reacted with liquid hydrogen sulfide in the presence of an organic base, e.g. triethylamine.

All of the methods described above have the disadvantage that the required initial material is either relatively expensive or difficult to acquire, or in some cases the yields of mercaptopropionic acid are unsatisfactory.

Since monochloroacetic acid and β-chloropropionic acid are available in large amounts as inexpensive initial materials, it is one object of the present invention to provide a simple and economical method which permits the production of mercaptoacetic acid (thioglycolic acid) or β-mercaptopropionic acid in high yields from these initial chlorocarboxylic acids. These and other objects and advantages will be more apparent from the following disclosure.

In accordance with the invention, a process has now been found for the production of a mercaptocarboxylic acid of the formula $HS—(CH_2)_n—COOH$, in which n is the integer 1 or 2, i.e. mercaptoacetic acid or β-mercaptopropionic acid, by reacting hydrogen sulfide under a partial pressure of at least 2 atm. in admixture with an aqueous solution of a carboxylic acid compound of the formula $Cl—(CH_2)_n—COOH$ or the ammonium or sodium salt thereof, n again being 1 or 2 in the presence of aqueous ammonium or sodium hydroxide, and then acidifying the reaction product. The process of the invention also requires the use of an initial reaction mixture which essentially has a concentration of the chlorocarboxylic acid or its ammonium or sodium salt in water of about 4.0 to 12 molar percent. The reaction or conversion is carried out with thorough mixing of this initial reaction mixture with the hydrogen sulfide at temperatures of about 60° to 140°C. and by using a partial pressure of hydrogen sulfide of preferably more than 2 atm., e.g. approximately 8 to 22 atm.

According to equations (1) and (2) below, the conversion of the monochloroacetic acid or the β-chloropropionic acid with hydrogen sulfide in an aqueous sodium or ammonium hydroxide solution leads to the corresponding salts of these mercaptocarboxylic acids, which may then be converted to the free mercaptocarboxylic acid by neutralization.

(1) $ClCH_2COOH + 2\ NaOH + H_2S \rightarrow HSCH_2COONa + NaCl + 2\ H_2O$
(2) $ClCH_2CH_2COOH + 2\ NaOH + H_2S \rightarrow HSCH_2CH_2COONa + NaCl + 2\ H_2O$ In addition to these primary reactions, parallel and secondary side reactions may occur which can substantially reduce the yield of the desired mercaptocarboxylic acid. For example, one competing reaction according to equations (3) and (4) is the substitution of chlorine by a hydroxy group to form the corresponding hydroxycarboxylic acids which can be further converted into undesirable β-lactones and polymerization products.

(3) $ClCH_2COOH + 2\ NaOH \rightarrow HOCH_2COONa + NaCl + H_2O$ (4) $ClCH_2CH_2COOH + 2\ NaOH \rightarrow HOCH_2CH_2COONa + NaCl + H_2O$ In one undesired secondary reaction according to equations (5) and (6), the initially produced mercaptocarboxylic acid combines with unreacted β-chlorocarboxylic acid to form the corresponding dicarboxylic acid sulfide.

(5) $HSCH_2COONa + ClCH_2COONa + NaOH \rightarrow NaOOCCH_2SCH_2COONa + NaCl + H_2O$ (6) $HSCH_2CH_2COONa + ClCH_2CH_2COONa + NaOH \rightarrow NaOOCCH_2CH_2SCH_2CH_2COONa + NaCl + H_2O$ Surprisingly, the formation of the by-products according to equations (3) and (5) or (4) and (6), respectively, can be considerably reduced by using the process of the invention.

It was found in the process of the invention that the hydrogen sulfide partial pressure substantially influences the yield as well as the selectivity of the reaction. For example, by using the specified molar proportions as between the chlorocarboxylic acid compound, the hydroxide and the hydrogen sulfide, and also maintaining a reaction temperature of 90°C., the yield of β-mercaptopropionic acid rises from 40% to above 53% and then nearly to 80% of theory if the partial pressure of the hydrogen sulfide is raised from 1 atm. to over 1 atm. and then up to 13 atm. Similar circumstances arise in the corresponding mercaptoacetic acid synthesis. If sodium hydroxide is utilized, the yields of mercaptoacetic acid exceed 95% of theory under a hydrogen sulfide partial pressure of above about 15 atm. If ammonium hydroxide is used, practically quantitative yields are achieved at a hydrogen sulfide partial pressure of only 8 atm. The same or similar situation exists in the β-mercaptopropionic acid synthesis. The reaction is preferably carried out under partial pressures of hydrogen sulfide within the range of about 8 – 22 atm., i.e. at least 15 atm. if sodium hydroxide is being used and at least 8 atm. if ammonium hydroxide is being used. Mixtures of sodium and ammonium hydroxides are also feasible with the minimum preferred pressure in the range of 8 – 15 atm. If hydrogen sulfide partial pressures higher than 22 atm. are used, there is no further improvement in either conversion or selectivity. As a practical matter, one normally will avoid partial pressures above 30 atm.

It was further found that the reaction temperature is likewise a significant influence in restraining the side-reactions (3) and (5) or (4) and (6). For example, under a constant partial pressure of hydrogen sulfide of 12 atm. and at a reaction temperature of 90°C., the yield of β-mercaptopropionic acid amounted to 90% of theory. This compared to only about 20% of theory at a lower reaction temperature of 35°C. Presumably, the reaction speed is more dependent upon the temperature for the primary reaction (1) and (2), relative to the side reactions (3) and (5) or (4) and (6). Even when using very high reaction temperatures, no increase in selectivity is achieved. The same is true of the corresponding mercaptoacetic acid synthesis. The process of the invention is therefore carried out at temperatures in the range of about 60° – 140°C. and preferably in the range of about 80° – 105°C.

The concentration of the aqueous reaction mixture is of far less importance in the present invention than in previously known methods for the production of mercaptoacetic acid from monochloroacetic acid solutions. Until now, it was commonly assumed that satisfactory yields of thioglycolic acid could be achieved only when starting with solutions containing up to a maximum of 15% by weight of sodium hydrogen sulfide and 20% by weight of monochloroacetic acid, and it was further thought that any increase in concentration of the reaction components by 5 or 10% would result in a reduction of the yield by about 10–20%. A similar result was also to be expected for the corresponding β-mercaptopropionic acid synthesis. Surprisingly, it was established by the present method of the invention that solutions having a considerably higher concentration are capable of giving an improvement in both the synthesis of mercaptoacetic acid and also the synthesis of the β-mercaptopropionic acid. In fact, without even a noticeable reduction in yield, it is possible with the process of the invention to proceed from an initial reaction mixture of such high concentration that it barely represents a homogeneous liquid phase under the reaction conditions. Any attempt to work with even more concentrated reaction mixtures, i.e. so as to form a heterogeneous phase, would cause a technical disadvantage and should therefore be avoided. In the process of the invention, the preferred concentration of monochloroacetic acid, its ammonium or sodium salt in water should amount to about 6.0 – 9.3 mol percent, and the concentration of the β-chloropropionic acid, its ammonium or sodium salt in water should amount to about 5.2 – 8.2 mol percent.

The sodium hydroxide or the ammonium hydroxide is preferably used in at least stoichiometric amounts. If monochloroacetic acid or β-chloropropionic acid is used as the initial reactant, the stoichiometric amount of the hydroxide is 2 mols per mol of the chlorocarbonic acid; if the sodium or ammonium salt of the chlorocarbonic acid is used, then at least an equimolar amount of the hydroxide is required. It was further discovered, however, that an excess of hydroxide of about 0.2 – 0.3 mols permits a considerable increase of the yield. However, any further excess brings no further advantage. Therefore, in the process of this invention, it is especially advantageous to select the molar ratio of sodium or ammonium hydroxide to the monochloroacetic acid or the β-chloropropionic acid at 2.1 - 2.3, i.e. 2.1:1 to 2.3:1. Likewise, the molar proportion of sodium or ammonium hydroxide to the sodium or ammonium salt of the chlorocarboxylic acid is preferably 1.1 – 1.3, i.e. 1.1:1 to 1.3:1.

The process of the invention can be accomplished continuously or discontinuously. However, it is very desirable to assure an effective and thorough mixing of the reaction components.

For example, in carrying out a discontinuous reaction, it is possible to first provide the aqueous hydroxide solution in an autoclave equipped with a stirring device and then to add the hydrogen sulfide until the desired reaction pressure is reached. Heat is then applied until the desired reaction temperature is achieved, after which an aqueous solution of the chlorocarboxylic acid or its salt is added. It is hereby necessary to effect good mixing of the reaction ingredients, i.e. to achieve a homogeneous phase with intimate contact of the finely dispersed reactants. If the turbulence of mixing is sufficient, reaction will occur immediately after the reaction components are combined.

In the β-mercaptopropionic acid synthesis, for example, under reaction conditions of 90° – 100°C. and 12 atm. H₂S partial pressure, a 90% yield can be achieved after only 2 – 6 minutes, and the maximum 100% yield after about 20 – 30 minutes. Similar results are achieved on the mercaptoacetic acid synthesis.

The continuous process of the invention may be performed in reaction vessels commonly used for gas — liquid reactions. For example, it is possible to proceed by first converting the hydrogen sulfide and the aqueous solution of hydroxide into the corresponding sodium or ammonium hydrogen sulfide in a preliminary reactor or reaction stage, then heating the resulting sodium or ammonium hydrogen sulfide solution up to the reaction temperature, and subsequently continuously reacting this heated solution in a main reactor under the desired pressure with the solution of the chlorocarboxylic acid or its salt, which has also been heated to the required reaction temperature. Any suitable heat exchange means may be used to heat the reactant before introduction into the main reactor. Mixing should also be provided in the continuous reaction, especially in the second stage or main reactor, using conventional mixing means including baffles or the like to ensure turbulence.

The final steps to be taken in the process of the invention for working up the reaction product are those usually employed in this art. First, the salt of the resulting mercaptocarboxylic acid is converted into the free mercaptocarboxylic acid, e.g. by cooling the reaction solution and adding a 50% concentrated sulfuric acid. The mercaptoacetic acid and the β-mercaptopropionic acid, both of which are well soluble in the aqueous reaction solution, are subsequently recovered by extraction with an organic solvent, e.g. diisopropyl ether. After evaporation of the organic solvent, the desired mercapto acid is obtained as a residue.

According to the process of the invention, mercaptoacetic acid (thioglycolic acid) and β-mercaptopropionic acid can be prepared in a nearly quantitative yield from the corresponding chlorocarboxylic acids or their sodium or ammonium salts. With reference to the mercaptoacetic acid synthesis, it is quite surprising that the process of the invention provides a reaction which proceeds even with relatively highly concentrated solutions to give practically quantitative yields. The present invention thus eliminates the considerably disadvantage of the mercaptoacetic acid synthesis according to Carius, namely the use of very dilute solutions. It is also surprising that the process of the present invention in converting β-chloropropionic acid does not result in an impure β-mercaptopropionic acid, as in the case of the Loven process, which must first be oxidized and then reduced. Instead, the reaction of this invention leads directly to the desired β-mercaptopropionic acid in almost quantitative yields.

Mercaptoacetic (thioglycolic) and β-mercaptopropionic acids are known to be valuable products. Among other uses, they are required in the cosmetic industry for the manufacture of cold permanent wave preparations. Mercaptoacetic acid is also used for the manufacture of depilatories as well as for removal of hair on animal hides. In addition, both compounds serve as highly effective catalysts, for example in the polymerization of styrene-butadiene, and they are also useful in the form of their tin salts as stabilizers for PVC (polyvinylchloride). Such uses are well described in the prior art.

The invention is further illustrated by but not limited to the following examples:

EXAMPLE 1

A glass autoclave of 1 liter capacity, equipped with a stirring device was employed as the reactor to carry out a single stage discontinuous or batch process. A diluted solution of caustic soda, pre-prepared from 42 grams of NaOH in 121 ml. water, was placed in this reactor, and gaseous hydrogen sulfide at 15°C. was introduced. The resulting sodium hydroxide sulfide solution was heated to 85°C. under a hydrogen sulfide pressure of 12 atm., and was then mixed within a few seconds with a solution of 54.2 grams of β-chloropropionic acid in 20 ml. water added with the aid of a pressurized burette. The composition of the initial reaction mixture corresponded to a β-chloropropionic acid concentration of 6 mol percent and a molar ratio of sodium hydroxide to β-chloropropionic of 2.10:1. Through neutralization of the β-chloropropionic acid, the reaction temperature immediately rose to 90°C. This temperature was maintained throughout the entire process by means of indirect cooling or heating as required. After a reaction period of 20 minutes, the final reaction mixture was released and cooled. The yield of β-mercaptopropionic acid amounted to 46.8 grams (88.3% of theory).

EXAMPLE 2

For the continuous preparation of β-mercaptopropionic acid, a conventional, vertically arranged flow reactor was provided in the form of a preliminary reactor, a main reactor and a separator, viewed from the bottom upwards in the direction of flow. The preliminary reactor had an inner diameter of 20 mm. and was 290 mm. long, and the main reactor had a diameter of 20 mm. and was 990 mm. long. Both reactors were filled with Raschig rings.

Gaseous hydrogen sulfide and a 20% by weight aqueous caustic soda solution were continuously fed by means of a flow meter into the lower part of the preliminary reactor. The through-put ratio was 0.5 Nm³/hr. of hydrogen sulfide and 0.835 mol/hr. of sodium hydroxide. The resulting sodium hydrogen sulfide solution was heated to 85°C. in the pre-reactor by means of jacket heating. The heated solution flowed upward into the main reactor, which had an inlet tube narrowed to form a mixing nozzle through which there was dosed 200 grams/hr. of a 20% by weight aqueous β-chloropropionic acid solution, corresponding to a through-put ratio of 0.363 mol/hr. of β-chloropropionic acid. The reaction temperature in the main reactor was maintained at 90°C., and a hydrogen sulfide pressure of 21 atm. was also maintained. The composition of the initial reaction mixture corresponded to a β-chloropropionic acid concentration in water of 4.0 mol percent and a sodium hydroxide to β-chloropropionic acid molar ratio of 2.30:1. The reaction mixture existing from the top of the main reactor was collected in the separator and analytic means were used to continuously determine the yield of β-mercaptopropionic acid. This yield amounted to 38 grams/hr. which corresponds to a yield of 98.7% of theory.

EXAMPLES 3 – 6

A solution of caustic soda (NaOH), hydrogen sulfide and the sodium salt of monochloroacetic acid were reacted for the production of mercaptoacetic acid or the so-called thioglycolic acid according to the same continuous procedure specified in Example 2. The following Table I sets forth the concentrations of various aqueous solutions of the caustic soda and the sodium salt of the monochloroacetic acid. The reaction conditions are also shown: the through-put ratio; the reaction temperature; and the partial pressure of hydrogen sulfide. The last entry gives the yields of thioglycolic acid. Comparative Example 6 clearly illustrates the sharp reduction in yield when working below 2 atm. partial pressure of hydrogen sulfide.

TABLE I

| Example No. | 3 | 4 | 5 | 6 | Comparative Example |
|---|---|---|---|---|---|
| NaOH Mol% in $H_2O$ | 10.11 | 10.11 | 10.11 | | 10.11 |
| NaOH (Mol/hr) throughput rate | 1.32 | 1.02 | 0.885 | | 0.885 |
| monochloroacetic acid Mol% in $H_2O$ | 9.30 | 7.50 | 6.00 | | 6.00 |
| monochloroacetic acid (Mol/hr) throughput | 0.600 | 0.485 | 0.385 | | 0.385 |
| NaOH/monochloroacetic acid Molar ratio | 2.2 | 2.1 | 2.3 | | 2.3 |
| Temperature °C | 90 | 90 | 90 | | 90 |
| $H_2S$-pressure (atm.) | 18 | 12 | 8 | | 0.5 |
| Yield thioglycolic acid | 99.3 | 95.8 | 92.2 | | 65.2 |

EXAMPLE 7

A solution of 4.08 grams (0.24 mol) of ammonia and 71.2 grams (3.96 mol) of water was placed into a glass autoclave of 1 liter capacity and preheated to 85°C. Into this solution, hydrogen sulfide was introduced under continuous stirring until a pressure of 8 atm. was achieved. Subsequently, a solution of 22.3 grams (0.2 mol) of ammonium chloroacetate in 67.8 grams (3.77 mol) of water was added quickly from a pressurized burette under vigorous stirring. After a reaction period of 15 minutes, the reaction mixture was worked up in the customary manner. The yield was quantitative, i.e. practically 100% of theory.

EXAMPLES NO. 8 – 10

For the preparation of thioglycolic acid, the method specified in Example 7 was followed in order to react ammonia, hydrogen sulfide and the ammonium salt of monochloroacetic acid. The following Table II sets forth the concentration of the reactants, the reaction temperatures, the partial pressure of hydrogen sulfide and finally the yields of the thioglycolic acid product.

TABLE II

| Examples | | No. | 8 | 9 | 10 |
|---|---|---|---|---|---|
| $NH_4SH$-Solution | $NH_3$ | g | 6.12 | 6.12 | 6.12 |
| | | Mol | 0.36 | 0.36 | 0.36 |
| | $H_2O$ | g | 62.5 | 37.5 | 19.0 |
| | | Mol | 3.47 | 2.1 | 1.05 |
| | $H_2S$ | atm | 8.0 | 8.5 | 9.0 |
| Cl—$CH_2COONH_4$ Solution | Cl—$CH_2COONH_4$ | g | 33.45 | 33.45 | 33.45 |
| | | Mol | 0.30 | 0.30 | 0.30 |
| | $H_2O$ | g | 57.5 | 57.5 | 56.0 |
| | | Mol | 3.19 | 3.19 | 3.11 |
| | HS—$CH_2COOH$ | % of theory | 99.9 | 100.0 | 99.9 |

The present invention offers a marked improvement and excellent results for the industrial or commercial production of mercaptoacetic and β-mercaptopropionic acids, not only due to the surprisingly high yields but particularly because one can begin with inexpensive raw materials and use them in very high concentrations. Whether working in batches or continuously or even semicontinuously, the process of the present invention maintains high yields with excellent conversions and selectivity as well as a high through-put. The separation of the final product is conventional but simplified due to the greater purity of the acids being produced.

The invention is hereby claimed as follows:

1. A process for the production of mercaptoacetic acid or β-mercaptopropionic acid which comprises reacting hydrogen sulfide at a partial pressure of at least 2 atm. and at a temperature of about 60°C. to 140°C. in admixture with an aqueous solution of a chlorocarboxylic acid of the formula Cl—$(CH_2)_n$—COOH or the corresponding ammonium or sodium salt thereof, n being the integer 1 or 2, in the presence of aqueous ammonium or sodium hydroxide and subsequently acidifying the reaction product, the initial reaction mixture consisting essentially of said chlorocarboxylic acid or said salt thereof in water in a concentration amounting to about 4.0 – 12 mol percent.

2. A process according to claim 1 wherein the reaction is carried out under a hydrogen sulfide partial pressure of between about 8 and 22 atm.

3. A process according to claim 1 wherein sodium hydroxide is used and the partial pressure of hydrogen sulfide is at least 15 atm.

4. A process according to claim 1 wherein ammonium hydroxide is used and the partial pressure of hydrogen sulfide is at least 8 atm.

5. A process according to claim 1 wherein the reaction is carried out at a temperature in the range of about 80°C. to 105°C.

6. A process according to claim 1 wherein the chlorocarboxylic acid is monochloroacetic acid and the concentration of said acid or its ammonium or sodium salt in water amounts to about 6.0 to 9.3 mol percent.

7. A process according to claim 1 wherein the chlorocarboxylic acid is β-chloropropionic acid and the concentration of said acid or its ammonium or sodium salt in water amounts to about 5.2 to 8.2 mol percent.

8. A process according to claim 1 wherein the molar ratio of the ammonium or sodium hydroxide to said chlorocarboxylic acid in the initial reaction mixture amounts to about 2.1 – 2.3.

9. A process according to claim 1 wherein the molar ratio of the ammonium or sodium hydroxide to the ammonium or sodium salt of the chlorocarboxylic acid in the initial reaction mixture amounts to about 1.1 – 1.3.

* * * * *